Jan. 27, 1959
P. WARGO
2,871,433
ELECTRIC SPEED INDICATING INSTRUMENT
Filed May 22, 1956
2 Sheets-Sheet 1
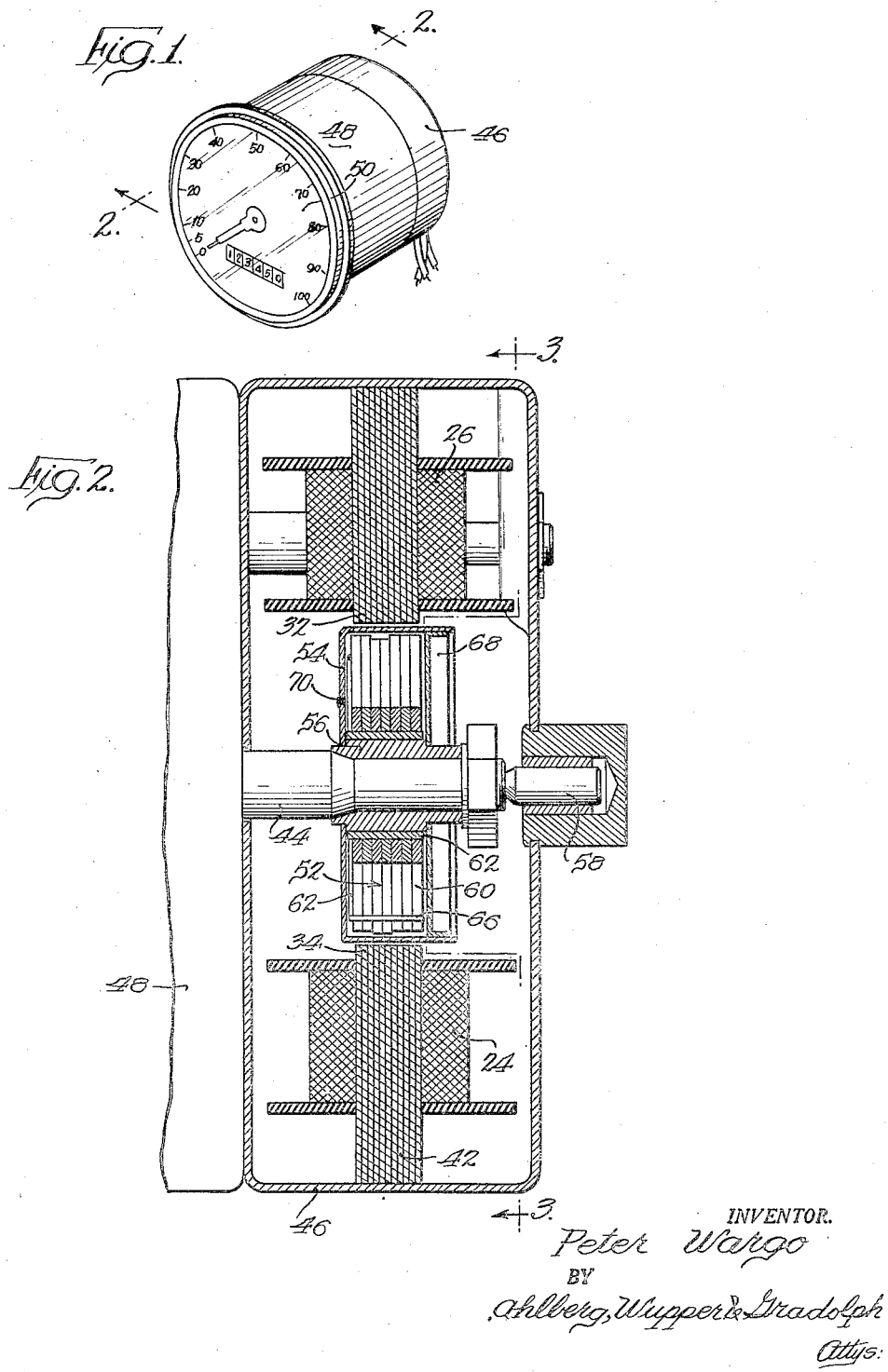
INVENTOR.
Peter Wargo
BY
Ahlberg, Wupper & Gradolph
Attys.

Jan. 27, 1959 P. WARGO 2,871,433
ELECTRIC SPEED INDICATING INSTRUMENT
Filed May 22, 1956 2 Sheets-Sheet 2
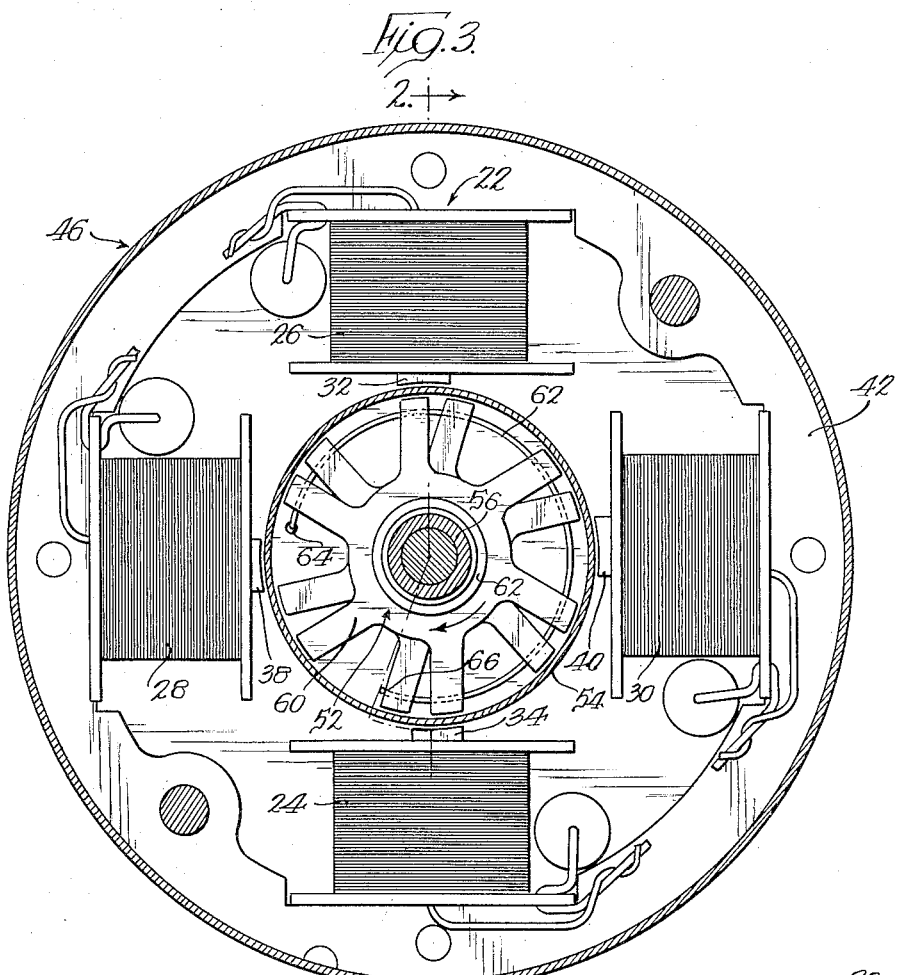
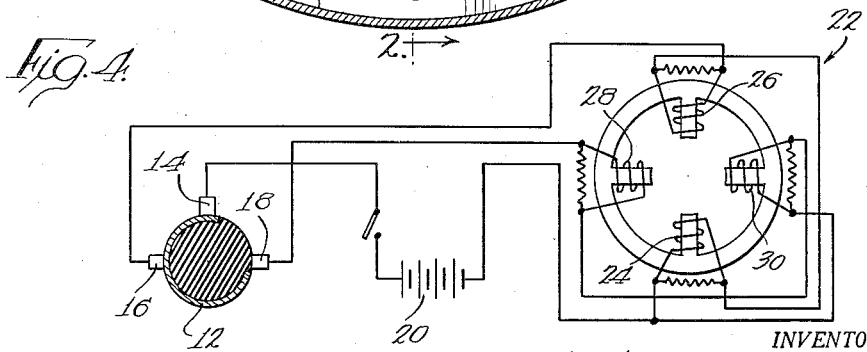
INVENTOR.
Peter Wargo
BY
Ahlberg, Wupper & Gradolph
Attys.

United States Patent Office 2,871,433
Patented Jan. 27, 1959

2,871,433
ELECTRIC SPEED INDICATING INSTRUMENT

Peter Wargo, Maywood, Ill., assignor to Stewart-Warner Corporation, Chicago, Ill., a corporation of Virginia Application May 22, 1956, Serial No. 586,488

13 Claims. (Cl. 318—166)

This invention relates to speed indicating devices, generally termed tachometers or speedometers, of the type in which a moving element operates a switch for sending electrical impulses, the switch being connected by electrical leads to a remote receiving unit wherein a pulse motor drives an instrument which in turn indicates the speed of the moving element. A speed indicating instrument or tachometer of this general character forms the subject matter of my Patent No. 2,649,559 issued August 18, 1953.

One of the objects of the present invention is to provide a novel electric tachometer, particularly a novel receiving unit therefor, which is accurate, has a good service life and is less expensive to manufacture than is customary for instruments of this type.

An additional object is to provide an improved pulse motor for driving a speed indicating instrument.

Yet another object is to provide an improved electric pulse motor drive for a speed indicating instrument, in which the driven element rotates smoothly even at low pulse rates and without relative slip between the driven shaft and the magnetically excited synchronous element.

Still another object is to provide a smooth running pulse motor which has no slip.

Yet another object is to provide a novel pulse motor which will run in one direction only.

Still another object is to provide a novel unidirectional pulse motor in which the armature is made up of a plurality of simple identical laminations.

Yet another object is to provide an improved instrument of the type described above which is insensitive to ambient temperature changes or voltage fluctuation.

Other objects and advantages will become apparent from the following description of a preferred embodiment of my invention which is illustrated in the accompanying drawings.

In the drawings, in which similar characters of reference refer to similar parts throughout the several views:

Figure 1 is a perspective view of a speed indicating instrument embodying features of the present invention;

Fig. 2 is a longitudinal vertical sectional view through the pulse motor which forms a portion of the mechanism of Fig. 1;

Fig. 3 is a transverse sectional view which may be considered as taken in the direction of the arrows substantially along the line 3—3 of Fig. 2; and Fig. 4 is an electrical circuit diagram of the speed indicating system.

As is fully explained in my previously referred to patent, a device of the general character which forms the subject of the present invention is used as a speed indicating instrument, commonly on automobiles. It may be connected and calibrated for indicating engine speed or road speed, and in either event has a switching element 12 which rotates with some moving element, the speed of which it is desired to measure. As an example, such switches are frequently incorporated in the engine distributor so that on the usual 4-cycle engine the switching element rotates at half engine speed. Calibration is for convenience then such as to indicate engine speed rather than half engine speed. This switching element 12 makes contact, as shown, with three brushes 14, 16, and 18, so arranged that the brush 14 is first electrically connected to the brush 16, thereafter to both brushes 16 and 18, and subsequently to brush 18, after which it is again connected to brushes 16 and 18, so that the cycle repeats endlessly, conveniently once for each revolution. The switch, therefore, acts as a single pole, double throw switch of the make before break type. It is connected electrically so that a source of electric power, ordinarily the automobile battery 20, is connected to energize a remote receiving unit at 22.

This receiving unit has two sets of field coils spaced 90° apart and is so connected that opposite coils, for instance 24 and 26, are connected together whereas the coils in between, 28 and 30, are similarly connected together for simultaneous energization. The leads from the receiving unit to the battery and switch are as shown so that coils 28 and 30 are energized whenever the switch interconnects brushes 14 and 18, whereas coils 24 and 26 are energized when the switch interconnects brushes 14 and 16. Thus, during rotation of the part the speed of which it is desired to measure, coils 24 and 26 are energized together and subsequently all four coils are energized, and still later coils 28 and 30 are energized.

Referring more specifically to Fig. 3, the coils 28, 30, 22 and 24, are shown as being mounted upon poles 38, 40, 32 and 34, respectively, the outer ends of these pole members being connected to or formed integrally with a surrounding magnetically permeable ring 42.

A rotating synchronous element, indicated generally at 54 is disposed at the center of the field thus formed and is connected to a coaxial output shaft 44 which drives a conventional speed indicating and revolution recording mechanism best seen in Fig. 1.

The motor portion of the mechanism just described is shown in the present example of the invention as being disposed within a case 46 directly attached to the rearward face of the speed indicator 48 with the drive shaft 44 extending from the motor through into the speed indicating instrument. Since the speed indicating mechanism within the case 48 may be entirely conventional it needs no description here. Ordinarily it will have its dial 50 so calibrated as to read directly in terms of miles per hour or engine revolutions per minute, or the like.

Referring more particularly to Figs. 2 and 3, it will be seen that the rotating synchronous element 44 is made up of an armature 52 housed within a short cylindrical case 54, such that the case and armature are both disposed within the space provided between the field poles 32, 34, 38 and 40. The case 54 is connected to a central hub 56 which in turn is secured to the output shaft 44. The outboard end of the shaft 44 is piloted by a bearing 58 while the other bearing for this shaft in the present instance is located within the case 48 out of view.

The armature portion 52 is made of a stack of identical laminations. In the present instance seven are shown and they are assembled by being press fitted upon a sleeve 62 which has a running fit with the hub 56 such that unless otherwise restrained, the armature is free to rotate relative to the hub 56.

The laminations 60 in the present instance, provide six poles or teeth which are relatively long and narrow, so that the spacing between the teeth is several times the width of the tooth at the periphery. These teeth are offset slightly, so that they are slightly behind a straight radial outward position, as is best seen in Fig. 3, the armature shown in Fig. 3 being adapted for clockwise rotation.

In assembling the laminations upon the sleeve 62 three laminations toward the back of the case are stacked and pressed upon the sleeve 62 in alignment, after which the next two are in alignment with each other, but are staggered so as to be in a position slightly ahead of the first three, and thereafter the last two laminations are pressed upon the sleeve 62 in alignment with the first group. The result is that at the periphery of the armature, at each of the poles thereof, there are five laminations in alignment, and two slightly ahead of the five. The result is that the smaller leading tooth provides a poorer magnetic flux conducting path or, in other words, has a pole strength which is considerably less than the pole strength provided by the trailing tooth.

In Fig. 3 the armature 52 is shown approximately in one of the positions it assumes when the top and bottom coils 22 and 24 are energized. Under these conditions the main vertical teeth of the armature are in substantial alignment with the poles 32 and 34 although the position of the armature is influenced somewhat by the attraction of the field pole pieces for the smaller leading teeth associated with the main teeth. This effect causes the main teeth to assume a position slightly counterclockwise of what they would take if it were not for the smaller supplementary teeth. Now when the horizontal coils 28 and 30 are also energized, these coils will exert an attraction for the supplementary armature teeth directly counterclockwise of these poles tending to rotate the armature slightly in a clockwise direction. Shortly thereafter, when the vertical coils 22 and 24 are deenergized, the supplementary teeth just counterclockwise of the poles 38 and 40 will move into alignment with these poles and therebeyond because of the greater attraction of the field poles for the main armature teeth just beyond the approximately horizontal supplementary teeth. Thus the supplementary armature teeth give the armature sense in that the armature will always tend to rotate in the same direction, but in a synchronous fashion.

Pulse motors of this general character will of course tend to operate in a step-by-step fashion, which gives a jerkiness to the movement of the armature, particularly at low revolution speeds of the switching rotor 12. I therefore provide a long, soft acting C-shaped spring member 62, which has one end hooked through a hole in the case wall as is indicated at 64, this hole being subsequently plugged by soldering to prevent leakage, whereas the other end of the spring is bent over to form a hook which catches on one of the rotor teeth, as is indicated at 66. The tooth catching against the hook 66, therefore, acts through the spring 62 to exert a torque upon the case 54, which causes rotation thereof in synchronism with the movement of the armature, although there will be a relative hunting as between these two elements. The cup-shaped member which forms the main element of the case 54, after the armature and spring have been placed therein, is closed by a cap 68, and the whole assembly is soldered so as to avoid the possibility of leakage. The space within the case is then substantially filled with a hydraulic damping fluid through a small hole, as at 70, the hole subsequently being closed by soldering. For this damping action, in the particular embodiment of the invention shown, I prefer to use a silicone fluid having a viscosity of approximately two hundred centistokes, since the viscosity of such fluids is quite insensitive to temperature changes and these oils are very stable chemically. Other oils could of course be used if desired.

The use of this hydraulic fluid in combination with the spring is quite effective in preventing jerky operation and also in preventing excessive hunting of the drive shaft relative to the armature.

A speed indicating instrument of this type will operate smoothly and without slip even in speedometer service where it is required to function throughout an extremely wide speed range. Furthermore it can be manufactured at quite low cost, among other reasons because all of the armature laminations are identical even though they provide uneven teeth in the assembly. It should be noted also that the field poles need not have extra elements to insure unidirectional rotation and that the resilient damped drive is inexpensive to provide.

From the above description of a preferred embodiment of my invention it will be apparent that variations can be made without departing from the scope or spirit of the invention and that the scope of the invention is therefore to be measured by the scope of the following claims.

I claim:

1. In an electric tachometer for measuring the speed of a moving part, the combination of a switch having an operating member adapted to be connected with the part, a source of electric power, a plurality of equidistantly spaced electromagnetic field poles including a plurality of field coils, conductors connecting alternate field coils in two groups to the switch and the source in two circuits, the switch being constructed so as to sequentially connect the field coil groups with the source for sequential magnetization of the field poles in response to movement of the part, a magnetically permeable motor armature mounted for rotation adjacent the field poles and including a plurality of equidistantly spaced main armature poles differing in number from and not a multiple of the number of field poles and having a pole pitch different from that of the field poles, a plurality of smaller supplementary armature poles staggered slightly with respect to said main poles, said armature being formed of a stack of substantially identical laminations, said laminations being so arranged that most of the laminations are in alignment to form said main poles, while the remaining laminations are in alignment with each other but offset circumferentially with respect to the group forming the main poles, a sealed case enclosing said armature, said case being freely rotatable relative to said armature, a liquid damping substance substantially filling said case, and a spring within said case attached at one end to said armature and at the other end to said case.

2. In an electric tachometer drive responsive to two electrical circuits which are sequentially energized by a moving part, a plurality of equidistantly spaced substantially symmetrical electromagnetic field poles including a plurality of field coils, conductors connecting alternate field coils in two groups to said circuits for sequential energization of said coil groups for sequential magnetization of the field poles in response to movement of the part, a magnetically permeable motor armature mounted for rotation adjacent the field poles and including a plurality of equidistantly spaced main armature poles having a pole pitch different from that of the field poles, and a plurality of smaller supplementary armature poles staggered slightly with respect to said main poles.

3. In an electric tachometer for measuring the speed of a moving part, the combination of a switch having an operating member adapted to be connected with the part, a source of electric power, a plurality of equidistantly spaced electromagnetic field poles including a plurality of field coils, conductors connecting alternate field coils in two groups to the switch and the source in two circuits, the switch being constructed so as to sequentially connect the field coil groups with the source for sequential magnetization of the field poles in response to movement of the part, a magnetically permeable motor armature mounted for rotation adjacent the field poles and including a plurality of equidistantly spaced main armature poles differing in number from and not a multiple of the number of field poles and having a pole pitch different from that of the field poles, a plurality of smaller supplementary armature poles staggered slightly with respect to said main poles, a sealed case enclosing said armature, said case being freely rotatable relative to said armature, a liquid damping substance substantially filling said case, means forming a resilient positive drive between said case and said armature, said drive comprising a C spring disposed within said case, said spring extending at least a portion of the way around said armature with one end of said spring secured to said armature and the other end thereof secured to said case, and means forming a rotatable driven element connected to said case coaxial with said armature.

4. In an electric tachometer for measuring the speed of a moving part, the combination of a switch having an operating member adapted to be connected with the part, a source of electric power, a plurality of equidistantly spaced electromagnetic field poles including a plurality of field coils, conductors connecting alternate field coils in two groups to the switch and the source in two circuits, the switch being constructed so as to sequentially connect the field coil groups with the source for sequential magnetization of the field poles in response to movement of the part, a magnetically permeable motor armature mounted for rotation adjacent the field poles and including a plurality of equidistantly spaced main armature poles differing in number from and not a multiple of the number of field poles and having a pole pitch different from that of the field poles, a plurality of smaller supplementary armature poles staggered slightly with respect to said main poles, said armature being formed of a stack of substantially identical laminations, said laminations being so arranged that most of the laminations are in alignment to form said main poles, while the remaining laminations are in alignment with each other but offset circumferentially with respect to the group forming the main poles, and said remaining laminations being sandwiched between two groups of the main pole laminations.

5. In an electric tachometer drive responsive to two electrical circuits which are sequentially energized by a moving part, a plurality of equidistantly spaced substantially symmetrical electromagnetic field poles including a plurality of field coils, conductors connecting alternate field coils in two groups to said circuits for sequential energization of said coil groups for sequential magnetization of the field poles in response to movement of the part, a magnetically permeable motor armature mounted for rotation adjacent the field poles and including a plurality of equidistantly spaced main armature poles having a pole pitch different from that of the field poles, a plurality of smaller supplementary armature poles staggered slightly with respect to said main poles, said armature being formed of a stack of substantially identical laminations, said laminations being so arranged that most of the laminations are in alignment to form said main poles, while the remaining laminations are in alignment with each other but offset circumferentially with respect to the group forming the main poles, and said remaining laminations being sandwiched between two groups of the main pole laminations.

6. In an electric tachometer drive responsive to two electrical circuits which are sequentially energized by a moving part, a plurality of equidistantly spaced electromagnetic field poles including a plurality of field coils, conductors connecting alternate field coils in two groups to said circuits for sequential energization of said coil groups for sequential magnetization of the field poles in response to movement of the part, a magnetically permeable motor armature mounted for rotation adjacent the field poles and including a plurality of equidistantly spaced main armature poles having a pole pitch different from that of the field poles, a plurality of smaller supplementary armature poles staggered slightly with respect to said main poles, a sealed case enclosing said armature, said case being freely rotatable relative to said armature, a liquid damping substance substantially filling said case, and means forming a resilient positive drive between said case and said armature.

7. In an electric drive, means forming a plurality of field poles, a magnetically permeable motor armature mounted for rotation under the influence of said field poles, a sealed case enclosing said armature, said case being freely rotatable relative to said armature, a liquid damping substance substantially filling said case, a spring disposed within said case, one end of said spring being attached to said armature and the other end thereof being attached to said case, and means forming a rotatable driven element secured to said case on an axis substantially coaxial with said armature.

8. An electric pulse motor of the type in which a pair of circuits are alternately completed to alternately energize at least two circumferentially spaced iron core electromagnets to rotate a multi-pole magnetic armature step by step, wherein the armature is characterized by a main pole structure comprising an aligned stack of laminations having equally spaced outwardly extending armature pole projections, and by a rotational direction controlling armature pole structure comprising at least one lamination similar to the main pole laminations and secured to the main pole laminations in circumferentially offset relation, the main pole laminations being greater in number than the direction controlling laminations to provide a substantially stronger magnetic path.

9. An electric pulse motor of the type in which two circuits are alternately completed with intermediate intervals of simultaneous completion and in which at least one electromagnet is energized by each circuit to rotate a multi-pole magnetic armature step by step, wherein the armature is characterized by a main pole structure comprising an aligned stack of laminations having equally spaced outwardly extending armature pole projections, and by a rotational direction controlling armature pole structure comprising at least one lamination similar to the main pole laminations and secured to the main pole laminations, the main pole laminations being greater in number than the direction controlling laminations to provide a substantially stronger magnetic path.

10. An electric pulse motor of the type in which a pair of electrical circuits are alternately completed to alternately energize the electromagnetic coils of a multi-pole stator structure to cause rotary step by step movement of a multi-pole magnetic armature structure and in which means are provided for causing only unidirectional movement of the armature and for eliminating a magnetic dead center which would otherwise prevent starting movement of the armature, wherein said means are characterized by one of the multi-pole structures comprising a plurality of main pole sections, and a plurality of secondary pole sections secured to the main pole sections in circumferential offset relation therewith and defining poor magnetic paths relative to the main pole section paths.

11. An electric pulse motor of the type in which a pair of circuits are alternately completed to alternately energize at least two circumferentially spaced iron core electromagnets to rotate a multi-pole magnetic armature step by step in response to the alternate energization of the electromagnets, wherein the armature is characterized by a main multi-pole magnetic structure and a rotational-direction-controlling second multi-pole armature structure secured to the main pole structure in circumferentially offset relation, said second pole structure providing a relatively weak magnetic path in relation to the magnetic path defined by the main pole structure.

12. In an electric pulse motor drive for an indicating instrument of the type in which a multi-pole armature is rotated step by step incident to the alternate energization of a pair of stationary electromagnets, in combination with the armature a rotatably mounted sealed enclosure surrounding the armature and mechanically connected to the indicating instrument, a spring resiliently coupling the armature to the enclosure, and a highly viscuous fluid in the chamber providing a damping coupling between the enclosure and the armature.

13. The combination set forth in claim 12 wherein the enclosure comprises a nonmagnetic metallic cylindrical portion disposed concentrically between the armature and the electromagnets, a pair of generally annular side walls adjacent opposite ends of the armature and secured to the cylindrical portion, and a central rotatably mounted hub portion which supports the enclosure and the armature.

References Cited in the file of this patent

UNITED STATES PATENTS

| | | |
|---|---|---|
| 1,367,679 | Adsit | Feb. 8, 1921 |
| 1,935,462 | Warren | Nov. 14, 1933 |